United States Patent Office 3,458,419
Patented July 29, 1969

3,458,419
SULFOCHLORINATION OF ALIPHATIC COMPOUNDS IN A SILENT DISCHARGE
Robert Fuhrmann, Morris Plains, Stylianos Sifniades, Parsippany, and David Jerolamon, Morristown, N.J., assignors to Allied Chemical Corporation, New York, N.Y., a corporation of New York
No Drawing. Filed Jan. 26, 1967, Ser. No. 611,806
Int. Cl. C07c 3/24; B01k 1/00
U.S. Cl. 204—174
5 Claims

ABSTRACT OF THE DISCLOSURE

The sulfochlorination of alkyl and cycloalkyl hydrocarbons and halogen derivatives thereof by mixtures of sulfur dioxide and chlorine is catalyzed by silent electric discharge.

---

This invention relates to a process for sulfochlorinating hydrocarbons and halogenated hydrocarbons. More particularly, this invention relates to the sulfochlorination of alkyl and cycloalkyl hydrocarbons and halogen derivatives thereof by a mixture of sulfur doxide and chlorine under the influence of silent electric discharges.

The sulfonyl chlorides prepared by the process of the current invention are useful intermediates for the preparation of sulfonic acids, sulfonamides, and salts of sulfonic acids. These materials are of very wide application as monomers, biodegradable surfactants, PVC plasticizers and cationic polymerization catalysts. Where a polymeric material is sulfochlorinated the sulfonyl chloride group may serve as a cross-linking site.

Aliphatic hydrocarbons have hitherto been sulfochlorinated using a variety of initiation techniques, all of which have significant shortcomings. Chemical initiation as, for example, with peroxides or azo catalysts, contaminants the product and necessitates a final purification thereof. Initiation by light is unsuitable for large scale application and provides very inefficient utilization of power input. Initiation by radiation requires elaborate shielding and other safety precautions. Thermally initiated sulfochlorination proceeds very slowly unless impracticably pure starting materials are utilized.

It is therefore a primary objective of this invention to provied a novel, safe, and efficient process for the sulfochlorination of alkyl and cycloalkyl hydrocarbons and halogenated derivatives thereof. It is a further object of this invention to provide a sulfochlorination process whereby elaborate purification of starting materials and reaction products is unnecessary. Further objects and advantages will become apparent from the description of the invention which follows in greater detail.

It has now been found in accordance with this invention that so-called silent or corona electric discharge is an excellent means of initiating sulfochlorination of hydrocarbons in the liquid or gas phase. Silent discharge, frequently also called corona discharge, as herein used connotes a flow of current between two oppositely charged electrodes which are separated by a gap and at least one and preferably two dielectric barriers. A detailed discussion of the principles of silent discharge may be found in "The Encyclopedia of Electrochemistry," edited by C. A. Hampel, Reinhold, 1964.

What this invention comprises therefore, is subjecting a mixture of sulfur doxide, chlorine and an alkyl, alicyclic, ir halogenated alkyl and alicyclic hydrocarbon or mixtures of said hydrocarbons to a corona electric discharge whereby sulfochlorination of the organic substrate occurs. The reaction may be represented as follows:

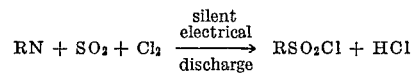

wherein R is an alkyl, cycloalkyl, or halogenated alkyl or cycloalkyl radical.

The function of the electrical discharge is believed to be to produce the free radicals R·, H· and Cl· by dissociating RH and $Cl_2$. Once these free radicals are available a chain reaction is established which propagates itself until the free radicals have spent themselves in recombination reactions or otherwise. The detailed mechanism of the reaction is thought to be as follows:

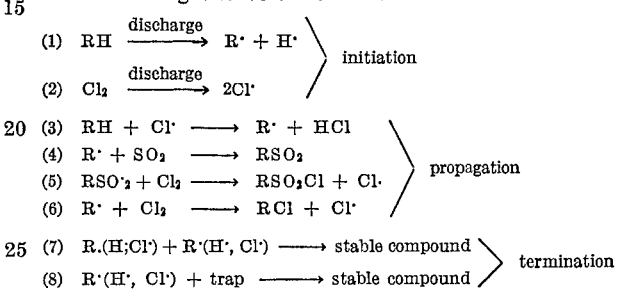

A trap as used in Equation 8 is any molecule, as for example an olefin, that will react with a free radical to form either immediately or after a short chain, a stable compound.

The alkyl, cycloalkyl and halogenated alkyl and cycloalkyl compounds which may be reacted according to the process of this invention include a plurality of saturated hydrocarbons, more specifically, linear and branched saturated simple aliphatic hydrocarbons, saturated alicyclic and alkylated alicyclic hydrocarbons, saturated linear and branched hydrocarbon polymers and copolymers and halogen derivatives of all of the foregoing classes of hydrocarbons. Representative compounds include methane, ethane, propane, normal and isobutane, hexane, heptane, octene, decane, dodecane, hexadecane, eicosane, tricosane, and the like, paraffin wax, polyethylene, ethylene propylene rubber, butyl rubbers, cyclohexane, methylcyclohexane, cyclooctaane, cyclododecane, chlorinated wax, chlorinated ethylene-propylene rubbers, chlorodecane, chlorocyclohexane, bromobutane, or mixtures thereof, and the like. In the preferred embodiment of this invention the alkyl compound is a $C_{12}$ to $C_{18}$ n-alkane.

In carrying out the process of the present invention the organic substrate may be reacted in solution in an inert solvent such as a perchlorinated aliphatic or chlorinated aromatic hydrocarbon or it may be reacted neat in either the gaseous or the liquid state, preferably the former when said organic substrate can be vaporized at a temperature below about 50° C. The preferred temperature limits of the process are between about −20° C. and about 120° C. Above 120° C. the reaction occurs by thermal initiation without discharge and the product is badly darkened. Below about −20° C. the reaction proceeds at a relatively slow rate.

Virtually any desired degree of sulfochlorination can be achieved by recirculation of the organic substrate through the discharge zone until the desired degree of sulfochlorination is achieved. The only possible reaction side product is the chlorinated compound produced as shown in reaction 6 above. To reduce this side reaction, the preferred $Cl_2/SO_2$ molar ratio is from about 0.05 to about 1. As the $Cl_2/SO_2$ ratio increases above about 1.0 chlorination according to reaction 6 becomes increasingly prevalent. At $Cl_2/SO_2$ ratios of greater than 2.0 chlorination is the predominant reaction. $Cl_2/SO_2$ ratios below about 0.01 require an uneconomically large reactor volume. An inert diluent gas such as nitrogen may be used with the preferred inert gas/$SO_2$ ratio being from about 0.5 to about 2.0.

Although the sulfochlorination reaction may be carried out at virtually any attainable pressure, a practical operating pressure range would be from about 0.1 to about 10 atmospheres with the preferred operating range being about 0.2 to about 2 atmospheres. Below about 0.1 atmosphere pressure an unduly large reactor volume is required and it is difficult to avoid outside contamination from leaks. Above about 10 atmospheres it is difficult to maintain the electric discharge.

Likewise, although virtually any attainable field strength and current frequency is usable for producing a silent discharge, the practical limitations on readily available equipment impose somewhat narrower limitations on these two reaction parameters. A suitable electric field strength is from about 5,000 to about 300,000 volts root-mean-square/cm. and preferably from about 10,000 to about 80,000 volts RMS/cm. Below about 5,000 volts RMS/cm. it is difficult to maintain the discharge and above about 300,000 volts RMS/cm. special insulation is necessary and excessive wear of the dielectrics occurs. A current frequency from about 25 to about 25,000 cycles/sec. and preferably about 60 to about 600 c.p.s. may be used. Above about 25,000 c.p.s. arcing is a serious problem and below about 25 c.p.s. power input to the electrodes is impractically low.

A discharge gap of about 0.1 to about 5.0 cm. may be used, preferably about 0.2 to about 0.6 cm. Above about 5.0 cm. an impracticably high voltage is required to maintain the operative electric field strength limits. It is mechanically difficult to uniformly maintain gaps below about 0.1 cm.

The invention can be more fully understood by reference to the following examples.

In all experiments care was taken to exclude light as soon as the reactants had been intermixed so that photochemical initiation of the reaction would be precluded and only discharge initiation would take place.

Example 1

527 grams (3.10 mols) of n-dodecane, which had been previously freed of unsaturated hydrocarbon and aromatics by passing through activated silica gel, was first saturated with sulfur dioxide and then recycled for 4 hours at the rate of about 800 cc./min. through a Siemens-type ozonizer in which the distance between the inner and outer tubes was 4.5 mm. and wherein the volume of the discharge space was about 230 cc. In the discharge zone, the dodecane was exposed to silent electric discharges with a potential difference of 11,300 volts, the frequency being 60 cycles per second (c.p.s.). For the first 70 minutes of the experiment a mixture of 8.2 parts by volume of sulfur dioxide to 1 part by volume of chlorine was passed through the ozonizer countercurrent to the liquid flow at the rate of 1,335 cc./min. Then the composition of the gaseous mixture was changed to 3.93 parts by volume sulfur dioxide to 1 part by volume chlorine and the flow rate reduced to 715 cc./min. This composition and flow were maintained for the rest of the experiment. The gaseous mixture was formed to pass through the bulk of the liquid phase before entering the discharge zone. The reaction temperature was 50° C. for the first 6 minutes of the experiment and then it was reduced quickly to 31° C. and maintained at this level for the rest of the experiment.

The spent gases consisting of sulfur dioxide, chlorine and the hydrogen chloride produced during the reaction, were sent to a water scrubber. Analysis of the contents of the scrubber at regular intervals showed that chlorine was being spent at a satisfactory rate. It was calculated that 51.3% of the chlorine passed through the ozonizer during the experiment reacted with n-dodecane and sulfur dioxide. This amount corresponds to 24.0 mol percent of the n-dodecane charged. At the end of 4 hours, the reaction mixture was freed from dissolved gases by blowing nitrogen through it under reduced pressure. Treatment by alcoholic alkali showed that it contained 15.4 mol percent dodecylsulfonylchloride.

Elemental analysis showed that it contained a 2.7 weight percent sulfur and 4.6 weight percent chlorine corresponding to 15.7 mol percent dodecyl sulfonylchloride and 9.11 mol percent content in dodecylchloride.

When the experiment was repeated using the same apparatus and similar operating conditions, but in the absense of silent electric discharges, i.e., with no potential difference applied across the electrodes, the rate of reaction of chlorine was much lower. In 90 minutes, the experiment was stopped and the reaction mixture analyzed as above. Treatment with alcoholic alkali showed less than 1 mol percent dodecylsulfonylchloride, while elemental analysis gave 0.14 weight percent sulfur and 0.23 weight percent chlorine, corresponding to 0.75 mol percent sulfochlorination and 0.39 mol percent chlorination.

Example 2

Four hundred grams n-dodecane, which contained as impurity 6.6 milliequivalents of olefinic unsaturation per 100 grams plus 0.18 weight percent aromatic hydrocarbons expressed as naphthalene were first saturated with sulfur dioxide and then recycled for 2 hours at the rate of about 800 cc./min. through a modified Siemens ozonizer in which the distance between the inner and outer tubes was 3 mm. and wherein the volume of the discharge space was about 140 cc. In the ozonizer, the hydrocarbon was exposed to silent electric discharges with a potential difference of 20,000 volts at a frequency of 60 c.p.s. Simultaneously, a gaseous mixture of 7.45 parts by volume sulfur dioxide to 1 part by volume chlorine was passed through the reactor in the same direction as the liquid flow at the rate of 1,350 cc./min. The flow of the gaseous mixture was arranged in such a way that it was kept in contact with the liquid for several seconds before entering the reactor, so that the liquid entering the ozonizer was essentially saturated with sulfur dioxide and chlorine. The temperature was maintained at about 30° C. throughout the experiment. The electric power spent in the reactor was recorded by means of a watt-hour-meter; it was 55 watt-hours. Elemental analysis of the reaction mixture after proper degassing gave sulfur and chlorine corresponding to 497 millimoles dodecylsulfonylchloride and 122 millimoles dodecylchoride. When the experiment was repeated under identica conditions and for the same length of time, but was no potential difference applied across the electrodes similar analysis revealed the presence of 99.5 millimoles dodecylsulfonylchloride and 70.5 millimoles dodecylchloride.

Example 3

The operation of Example 2 was repeated using 403 grams of cyclohexane (99% purity) as substrate. The same composition and flow rate of gases was used. At the end of 3 hours of reaction, 57 watt-hours of electrical energy had been consumed in the reactor. The unreacted hydrocarbon was removed by evaporation under reduced pressure leaving 143.5 grams of an oily residue. Treatment of this residue with alcoholic alkali revealed the existence of 754 millimoles of cyclohexylsulfonylchloride in the residue corresponding to 136.8 grams.

When the experiment was repeated under identical conditions and for the same length of time, but with no potential applied across the electrodes only 32.5 grams of oily residue was obtained after evaporation.

Example 4

The operation of Example 2 was repeated using a solution of 50 grams AC–6A wax (low molecular weight polyethylene) dissolved in 715 grams o-dichlorobenzene. The temperature was maintained at 68° C. The same composition and flow rates of gases were used. At the end of one hour, 34 watt-hours of electrical energy had been consumed in the reactor. Analysis of the contents of the water scrubber showed that 83 weight percent of the chlorine passed through the ozonizer had reacted with the substrate. Elemental analysis of the product after removal of the solvent by evaporation gave 10.6 weight percent sulfur and 17.4 weight percent chlorine.

When the experiment was repeated under identical conditions and for the same length of time, but with no potential difference applied across the electrodes, similar analysis showed that only 26 weight percent of the chlorine reacted and the product contained 2.2 weight percent sulfur and 5.7 weight percent chlorine.

Example 5

The operation of Example 2 was repeated using a solution of 407 grams of Chlorowax–40 (a chlorinated paraffin) in 324 grams of carbon tetrachloride. The temperature was maintained at 64° C. to 65° C. At the end of one hour, 31 watt-hours of electrical energy had been consumed in the reactor. Elemental analysis of the contents of the water scrubber showed that 18 weight percent of the chlorine passed through the reactor had reacted with the substrate.

Example 6

The operation of Example 2 was repeated using 400 cc. of dodecane. The gaseous feed consisted of 1.36 volume parts sulfur dioxide and one part per volume chlorine at the rate of 970 cc./min. At the same time, one liter of nitrogen per minute was also added. The potential difference across the discharge gap was 16,700 volts at 600 c.p.s. At the end of one hour, 300 watt-hours of electrical energy had been consumed in the ozonizer. Elemental analysis of the water scrubber contents indicated that 41 weight percent of the chlorine passed through the reactor had reacted with dodecane and sulfur dioxide.

We claim:

1. A process for the sulfochlorination of alkyl and cycloalkyl hydrocarbons and halogen derivatives thereof which comprises reacting said hydrocarbon with a mixture of chlorine and sulfur dioxide wherein the mole ratio of chlorine to sulfur dioxide is maintained in the range of from about 0.05 to about 2 under the influence of silent electrical discharges having a frequency from about 25 cycles per second to about 25,000 cycles per second and wherein the reaction is carried out at a temperature of from about −20° C. to about 120° C. and at a pressure of from about 0.1 atmosphere to about 10 atmospheres.

2. A process in accordance with claim 1 wherein said reaction is carried out at a temperature of from about 10° C. to about 60° C.

3. A process in accordance with claim 1 wherein the chlorine to sulfur dioxide mole ratio is from about 0.05 to about 1.0.

4. A process in accordance with claim 1 wherein the frequency of the current inducing the silent electrical discharge is from about 60 to about 600 cycles/sec. and the electric field strength is from about 50,000 to about 300,000 volts root-mean-square/cm.

5. A process in accordance with claim 1 wherein the hydrocarbon is a $C_{12}$ to $C_{18}$ n-alkane.

References Cited

UNITED STATES PATENTS

| | | | |
|---|---|---|---|
| 1,796,110 | 3/1931 | Lechler | 204—174 |
| 2,265,163 | 12/1941 | Herold | 204—169 |

ROBERT K. MIHALEK, Primary Examiner

U.S. Cl. X.R.

204—162